(12) United States Patent
Eslinger et al.

(10) Patent No.: US 6,910,094 B1
(45) Date of Patent: Jun. 21, 2005

(54) SECURE MEMORY MANAGEMENT UNIT WHICH USES MULTIPLE CRYPTOGRAPHIC ALGORITHMS

(75) Inventors: Gregory Clayton Eslinger, Phoenix, AZ (US); Mark Leonard Buer, Chandler, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 930 days.

(21) Appl. No.: 09/186,546

(22) Filed: Nov. 5, 1998

Related U.S. Application Data

(63) Continuation-in-part of application No. 08/947,378, filed on Oct. 8, 1997, now Pat. No. 6,003,117.

(51) Int. Cl.[7] .............................................. G06F 12/00
(52) U.S. Cl. ........................... 711/5; 711/164; 713/189; 713/190
(58) Field of Search ..................... 711/5, 164; 713/189, 713/190; 380/28, 59

(56) References Cited

U.S. PATENT DOCUMENTS

| | | | |
|---|---|---|---|
| 4,847,902 A | | 7/1989 | Hampson |
| 5,081,675 A | | 1/1992 | Kittirutsunetorn |
| 5,224,166 A | | 6/1993 | Hartman, Jr. |
| 5,268,962 A | * | 12/1993 | Abadi et al. .................. 380/21 |
| 5,757,919 A | | 5/1998 | Herbert et al. |
| 5,850,452 A | * | 12/1998 | Sourgen et al. ................ 380/50 |
| 5,915,025 A | * | 6/1999 | Taguchi et al. ................ 380/44 |
| 6,272,637 B1 | * | 8/2001 | Little et al. .................. 713/194 |
| 6,345,359 B1 | * | 2/2002 | Bianco ......................... 713/190 |

FOREIGN PATENT DOCUMENTS

| | | | | |
|---|---|---|---|---|
| EP | 0694 846 A1 | | 1/1996 | |
| EP | 0720 098 A1 | | 7/1996 | |
| ZA | 9008287 A | * | 7/1991 | ........... G06F/12/14 |

OTHER PUBLICATIONS

PCT Written Opinion that indicates the degree of relevance found by the foreign office of EP 0720 098 A1 to the present case.

* cited by examiner

*Primary Examiner*—Kevin Verbrugge
(74) *Attorney, Agent, or Firm*—Kevin Simons

(57) ABSTRACT

An integrated circuit accesses first encrypted data stored in an external random access memory and accesses second encrypted data stored in an external read-only memory. The external random access memory and the external read-only memory are external to the integrated circuit. When accessing a first portion of the first encrypted data stored in the external random access memory, a first algorithm is used to decrypt the first portion of the first encrypted data. When accessing a first portion of the second encrypted data stored in the external read-only memory, a second algorithm is used to decrypt the first portion of the second encrypted data. The second algorithm is different than the first algorithm.

12 Claims, 6 Drawing Sheets

US 6,910,094 B1

SECURE MEMORY MANAGEMENT UNIT WHICH USES MULTIPLE CRYPTOGRAPHIC ALGORITHMS

CROSS REFERENCE TO RELATED APPLICATION

This application is a continuation-in-part of application Ser. No. 08/947,378, filed Oct. 8, 1997, now U.S. Pat. No. 6,003,117, by Mark Leonard Buer and Gregory Clayton Eslinger for SECURE MEMORY MANAGEMENT UNIT WHICH UTILIZES A SYSTEM PROCESSOR TO PERFORM PAGE SWAPPING.

BACKGROUND

The present invention concerns memory management in a computer system designs and pertains particularly to a secure memory management unit which uses multiple cryptographic algorithms.

In order to protect against theft or misuse, secure information within a computing system can be encrypted before being stored in the memory for the computing system. When a secure integrated circuit uses the secure information, the secure information is transferred to the integrated circuit and decrypted before being used. Secure information returned to the memory for the computing system is encrypted before being stored.

Typically, decryption and encryption is handled by a secure memory management unit (SMMU) on the integrated circuit. When a processor requires the use of a page of secure information, the secure memory management unit on the integrated circuit obtains the page of secure information, decrypts the page of secure information and places the data in a cache memory for access by the processor. The cache is typically implemented using static random access memory (SRAM).

If, in order to bring in the page of secure information, a "dirty" page of information needs to be swapped out to memory, the SMMU performs the swap out of the "dirty" page of information before the new page is placed in the cache. A "dirty" page of information is a page of information which has been written to while in the cache where the changes made have not been written out to the system memory. If the "dirty" page of information contains secure information, the SMMU first encrypts the page before swapping the page out to system memory. While performing page swapping the SMMU holds off the processor while pages are being swapped to and from the processor cache.

The SMMU handles all secure information for a computing system. The secure information can include both executable code (typically stored in a read-only memory (ROM)) and data (typically stored in random access memory (RAM)).

SUMMARY OF THE INVENTION

In accordance with the preferred embodiment of the present invention, an integrated circuit accesses first encrypted data stored in an external random access memory and accesses second encrypted data stored in an external read-only memory. The external random access memory and the external read-only memory are external to the integrated circuit. When accessing a first portion of the first encrypted data stored in the external random access memory, a first algorithm is used to decrypt the first portion of the first encrypted data. When accessing a first portion of the second encrypted data stored in the external read-only memory, a second algorithm is used to decrypt the first portion of the second encrypted data. The second algorithm is different than the first algorithm.

For example, the first portion of the second encrypted data includes instructions for execution by a processor and the first portion of the first encrypted data includes data used during execution by the processor. When returning the first portion of the first encrypted data to the external random access memory, the first algorithm is used to encrypt the first portion of the first encrypted data.

In the preferred embodiment, in order to provide extra protection, a new decryption key for the first algorithm is generated upon start-up and upon reset of the integrated circuit.

The present invention allows for an increase in security. In addition, the use of different algorithms allows a highly secure algorithm to be used for information which is only to be decrypted and a less secure algorithm for data which will be encrypted and decrypted. One reason the less secure algorithm does not need to be as strong as the highly secure algorithm is because the data encrypted by the less secure algorithm does not remain encrypted for as long a period of time as data encrypted by the highly secure algorithm. In this way security may be provided while at the same time providing greater flexibility in designing parts which conform to various export laws which forbid export of parts with certain encryption capability.

DESCRIPTION OF THE PREFERRED EMBODIMENT

Figure 1:
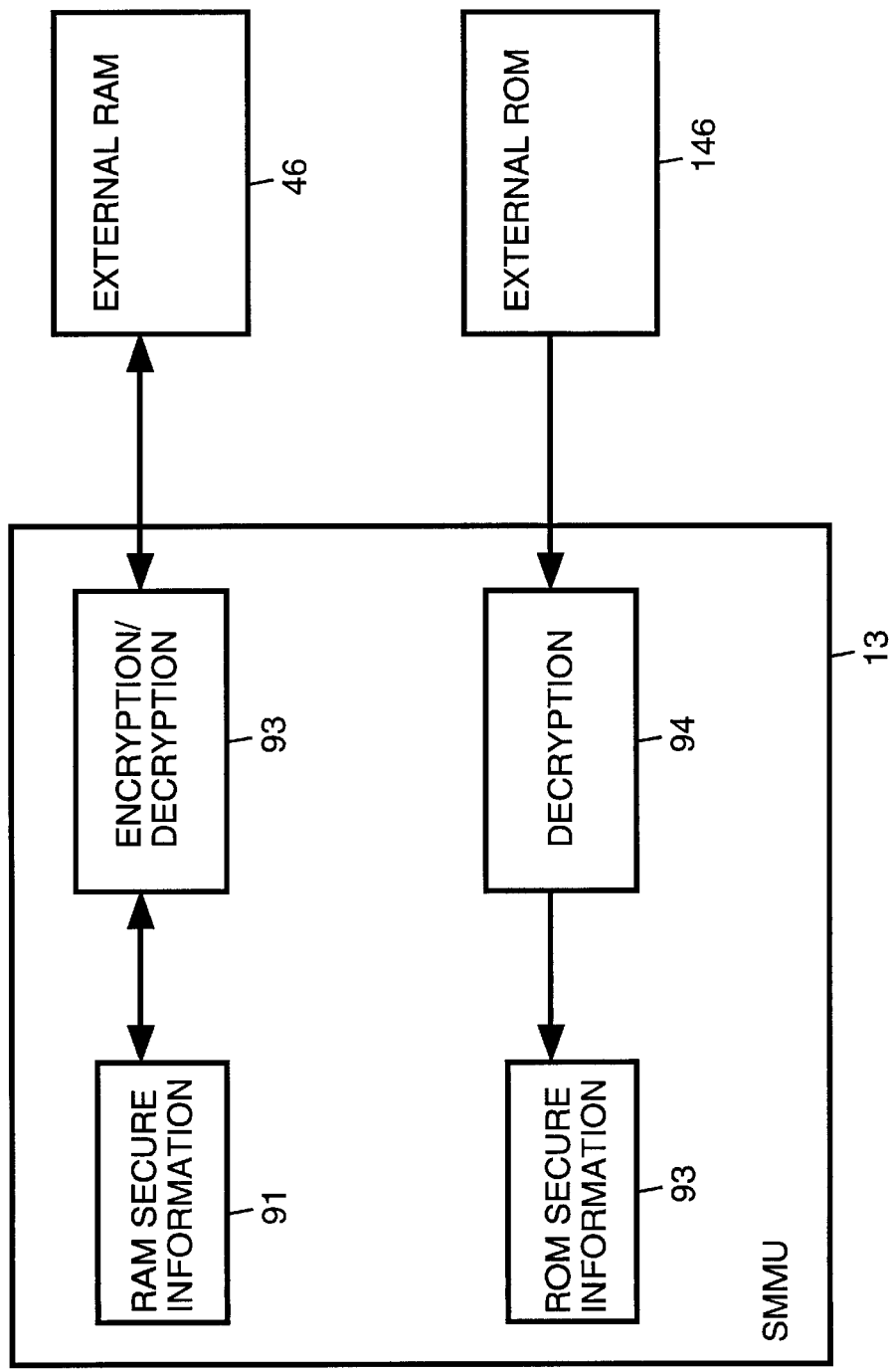
FIG. 1 is a simplified block diagram illustrating different cryptographic algorithms being used on information dependent upon whether the information is an instruction stored in ROM or data stored in RAM in accordance with the preferred embodiment of the present invention.

FIG. 1 is a simplified block diagram illustrating different cryptographic algorithms, within a single secure memory management unit (SMMU) 13, being used on information dependent upon whether the information is an instruction stored in an external read-only memory (ROM) 145 or data stored in an external random access memory (RAM) 45. Any type of SMMU system implemented in either hardware or software can be used to implement SMMU 13.

For secure instructions (or other secure data) stored in external ROM 145, a decryption algorithm 94 is used for decryption before placing the information in a section of memory reserved as ROM secure information 92. For secure data stored in external RAM 45, an encryption/decryption algorithm 93 is used for decryption before placing the information in a section of memory reserved as ROM secure information 92, and is used for encryption before returning the information back into external RAM 45.

Encryption/decryption algorithm 93 can be made more secure by randomly generating, after each reset of SMMU 13, a unique reset key used in encryption/decryption algorithm 93. This separate reset key is then used to encrypt/decrypt RAM secure information 91 passing through SMMU 13. Generating a unique key for each reset of SMMU increases the security of the SMMU 13 by reducing the length of time SMMU 13 would be compromised if the key was discovered. The unique key generated for encryption/decryption algorithm 93 is a different key than the key used for decryption algorithm 94. Thus, for SMMU 13 it would be necessary to discover two secure keys (the unique key generated for encryption/decryption algorithm 93 and the separate secure key used for decryption algorithm 94) in order to compromise the security of SMMU 13.

In the preferred embodiment, encryption/decryption algorithm 93 and decryption algorithm 94 operate in accordance with the Data Encryption Standard (DES). See for example, *Data Encryption Standard (DES)*, Federal Information Processing Standards Publication (FIPS PUB) 91–2, Dec. 30, 1993 available from the U.S. Department of Commerce, Technology Administration, National Institute of Standards and Technology. See also *DES Modes of Operation*, Federal Information Processing Standards Publication (FIPS PUB) 81, Dec. 2, 1980 available from the U.S. Department of Commerce, National Bureau of Standards. Alternatively, some other encryption/decryption algorithm may be used.

Decryption algorithm 94 is, for example, a 56-bit 3 DES algorithm which uses a 56-bit secure key. Encryption/decryption algorithm 93 is, for example, a 40-bit 1 DES algorithm which uses a 40-bit secure key. Because encryption is only performed using the 40-bit 1 DES algorithm, maximum performance is obtained while still providing significant protection for ROM secure information 92 and RAM secure information 91.

The two algorithm system may be variously integrated into processor systems which utilize a secure memory management unit (SMMU).

Figure 2:
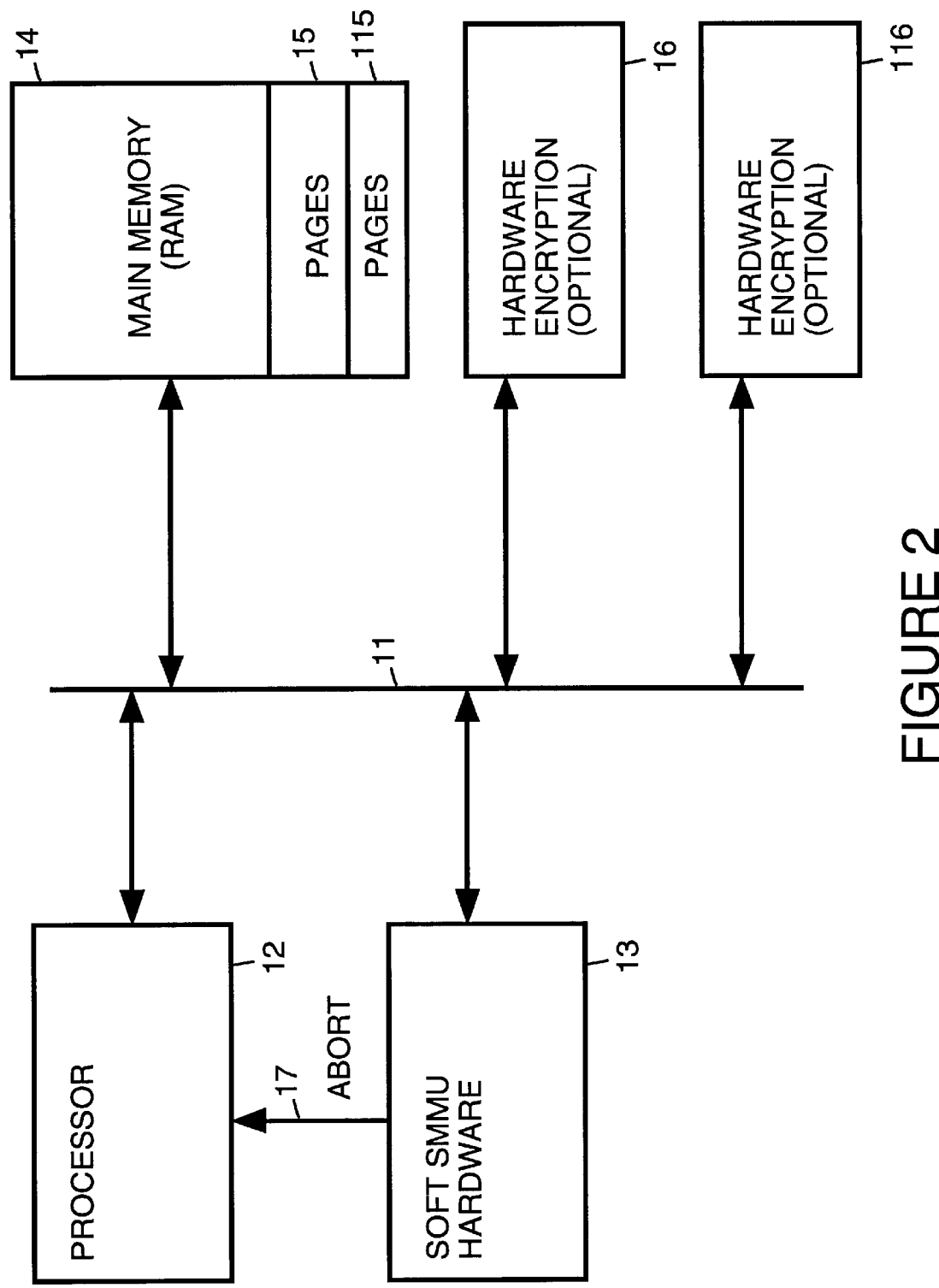
FIG. 2 is a simplified block diagram of an integrated circuit which includes a secure memory management unit in accordance with the preferred embodiment of the present invention.

For example, FIG. 2 is a simplified block diagram of an integrated circuit which includes a system processor 12, a soft secure memory management unit (SMMU) 13, and main memory 14 connected to a processor bus 11. For example, processor 11 is an ARM7TDMI processor or another processor that may be included on an integrated circuit. Main memory 14 is, for example, implemented as a static random access memory (SRAM). A hardware encryption core 16 may be included. Alternatively, encryption/decryption may be performed by system processor 12. For example, encryption and decryption is performed in accordance with the Data Encryption Standard (DES).

Soft SMMU 13 takes advantage of system processor 12 to handle page allocation and data movement for page updates. Functionality of soft SMMU 13 is reduced to maintaining page information and triggering an abort of the memory cycle on a page miss. System processor 12 can interrupt the abort as a page miss and update the page registers in the soft SMMU 13. The new page can then be loaded and decrypted by system processor 12. This allows great flexibility in the determination of multiple pages, write back capability, or locking pages that are used often. As mentioned above, hardware encryption core 16 is not required for low end applications or for simple encryption methods. For these case an encryption/decryption algorithm can be resident on system processor 12.

In the preferred embodiment, the hardware within soft SMMU 13 is page modular. The timing requirements are greatly reduced since soft SMMU 13 only compares an address received on an external bus to the page boundaries in the page registers within soft SMMU 13. Soft SMMU 13 can abort the cycle at the end of the memory transaction, therefore soft SMMU 13 does not have to make a comparison at the beginning of the cycle. Since data is moved by system processor 12, there are no special DMA ports or DMA busses that are necessary. System processor 13 can move the data on the memory bus 11.

The data pages that are cached by system processor 12 can be stored as pages 15 in main memory 14, which serves as scratch memory space for processor 12. Instructions that are cached by system processor 12 can be stored as pages 115 in main memory 14. Alternatively, the instructions can be stored in a separate instruction cache. Soft SMMU 13 is a simple peripheral attached to processor bus 11.

Soft SMMU 13 monitors address requested by system processor 12 for an instruction or data operation that is within the page limits of secure information stored in an external system memory (either external RAM 45 or external ROM 145). The external system memory is external to the integrated circuit. Limit registers within soft SMMU 13 indicate the page limits of secure information stored in the external system memory. If the data requested by system processor 12 is within the page limits of secure information stored in the external system memory but is not located on a page that is currently held in main memory 14, soft SMMU 13 will abort the operation using an abort line 17.

Figure 3:
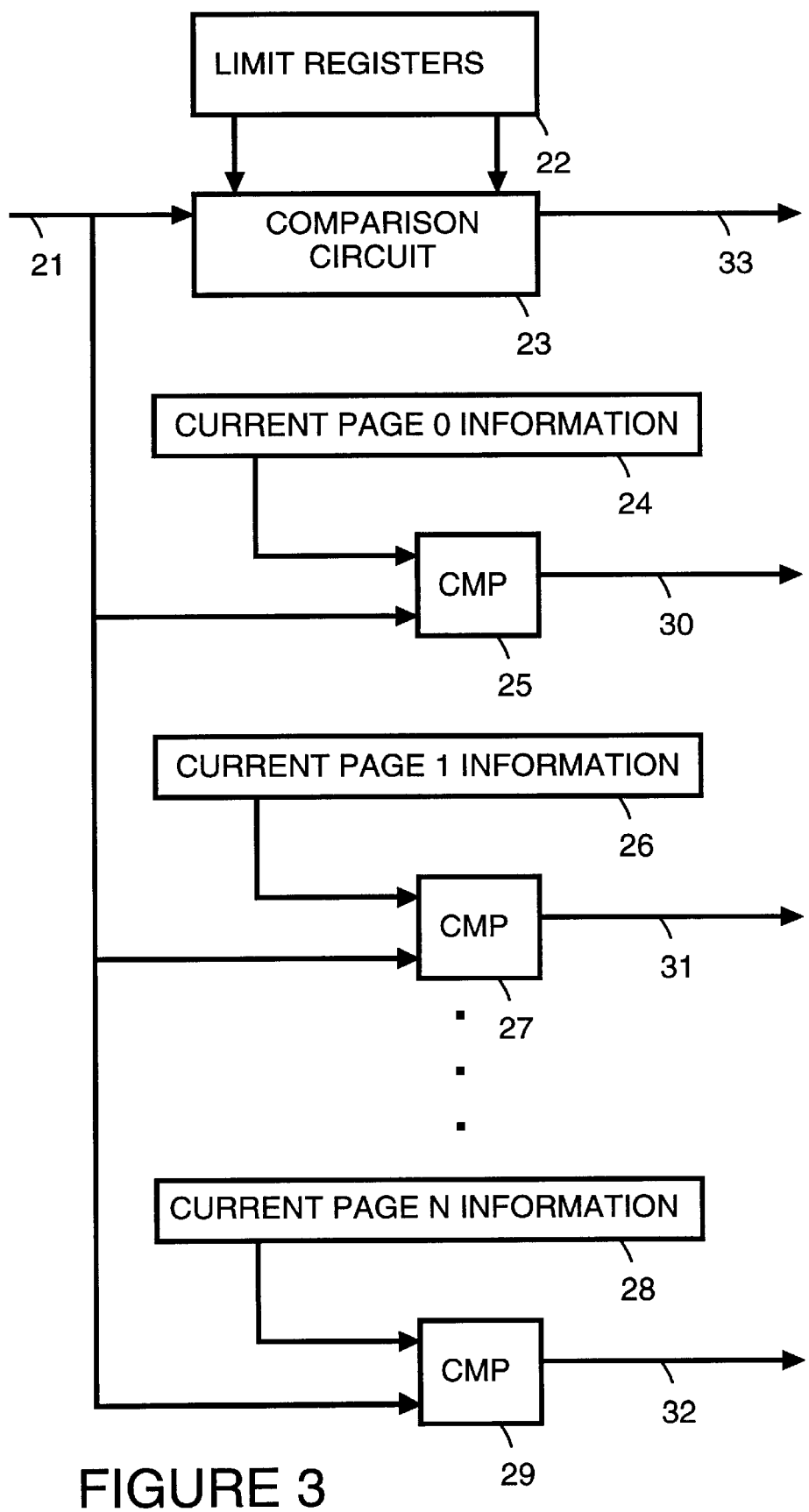
FIG. 3 is a simplified block diagram of the secure memory management unit shown in FIG. 2 in accordance with the preferred embodiment of the present invention.

FIG. 3 is a simplified block diagram of soft SMMU 13. Limit registers 22 store page limits for secure information within an external system memory external to the integrated circuit. A comparison circuit 23 compares the page limits in limit registers 22 with an address on address lines 21 of processor bus 11. When the address on address lines 21 is within the page limits in limit registers 22, a WITHIN flag on a line 33 is asserted true.

Registers 24 contain information (e.g., start address and page size) of a "page 0" of data stored in pages 15 of main memory 14. A comparison circuit 25 compares the information in registers 24 with the address on address lines 21 of processor bus 11 to determine whether the address on address lines 21 addresses data stored in "page 0" of data stored in pages 15 of main memory 14. When the address on address lines 21 addresses data stored in "page 0" of data stored in pages 15, an "EQ0" flag on a line 30 is asserted true Registers 26 contain information (e.g., start address and page size) of a "page 1" of data stored in pages 15 of main memory 14. A comparison circuit 27 compares the information in registers 26 with the address on address lines 21 of processor bus 11 to determine whether the address on address lines 21 addresses data stored in "page 1" of data stored in pages 15 of main memory 14. When the address on address lines 21 addresses data stored in "page 1" of data stored in pages 15, an "EQ1" flag on a line 31 is asserted true.

For every page in pages 15 and pages 115, soft SMMU 13 contains similar circuitry. For example, registers 28 contain information (e.g., start address and page size) of a "page N" of data stored in pages 15 of main memory 14. A comparison circuit 29 compares the information in registers 28 with the address on address lines 21 of processor bus 11 to determine whether the address on address lines 21 addresses data stored in "page N" of data stored in pages 15 of main memory 14. When the address on address lines 21 addresses data stored in "page N" of data stored in pages 15, an "EQN" flag on a line 32 is asserted true.

Limit registers 22 and registers 24, 26 and 28 can be accessed by processor 12. This allows for great flexibility in configuring the external memory, main memory 14 and the page size of individual pages.

For a page access, soft SMMU 13 determines there is a HIT when the address on address lines 21 results in, for a page X, the EQ flag being asserted (EQX) and the page being enabled (ENABLEX). Thus there is a HIT on page 0 for EQ0 AND ENABLE0. There is a HIT on page 1 for EQ1 AND ENABLE1. There is a HIT on page N for EQN AND ENABLEN.

The address on address lines 21 is used to access a value within pages 15 or pages 115 of main memory 14, when there is a fetch command and the address on address lines 21 results in a HIT and the WITHIN flag on a line 33 is asserted true.

Soft SMMU 13 detects a miss when there is a fetch command and the address on address lines 21 does not result in a HIT and the WITHIN flag on a line 33 is asserted true. In this case, the desired page needs to be swapped n from the external system memory and decrypted. If necessary (and only for pages 15 from external RAM 45) a page is swapped out of main memory 14 to make room for the new page.

When soft SMMU 13 detects a fetch command, the address on address lines 21 results in a HIT and the WITHIN flag on a line 33 is not asserted true, then the memory transaction does not involve secure information.

The last used page is determined by latching the EQ0 through EQN values.

System processor 12 is the engine which performs necessary SMMU operations to allow encrypted data external to the integrated circuit to be utilized by system processor 12. In a preferred embodiment, processor performs encryption and decryption using two encryption engines to implement two separate decryption algorithms (an encryption/decryption algorithm for data from external RAM 45 and a decryption algorithm for information from external ROM 145). Alternatively, as discussed above, system processor 12 can perform encryption and decryption using two separate software algorithms (a software encryption/decryption algorithm for data from external RAM 45 and a software decryption algorithm for information from external ROM 145).

For more information on operation of SMMU 13, see U.S. patent application Ser. No. 08/947,378, filed Oct. 8, 1997, by Mark Leonard Buer and Gregory Clayton Eslinger for SECURE MEMORY MANAGEMENT UNIT WHICH UTILIZES A SYSTEM PROCESSOR TO PERFORM PAGE SWAPPING, the subject matter of which is hereby incorporated by reference.

Figure 4:
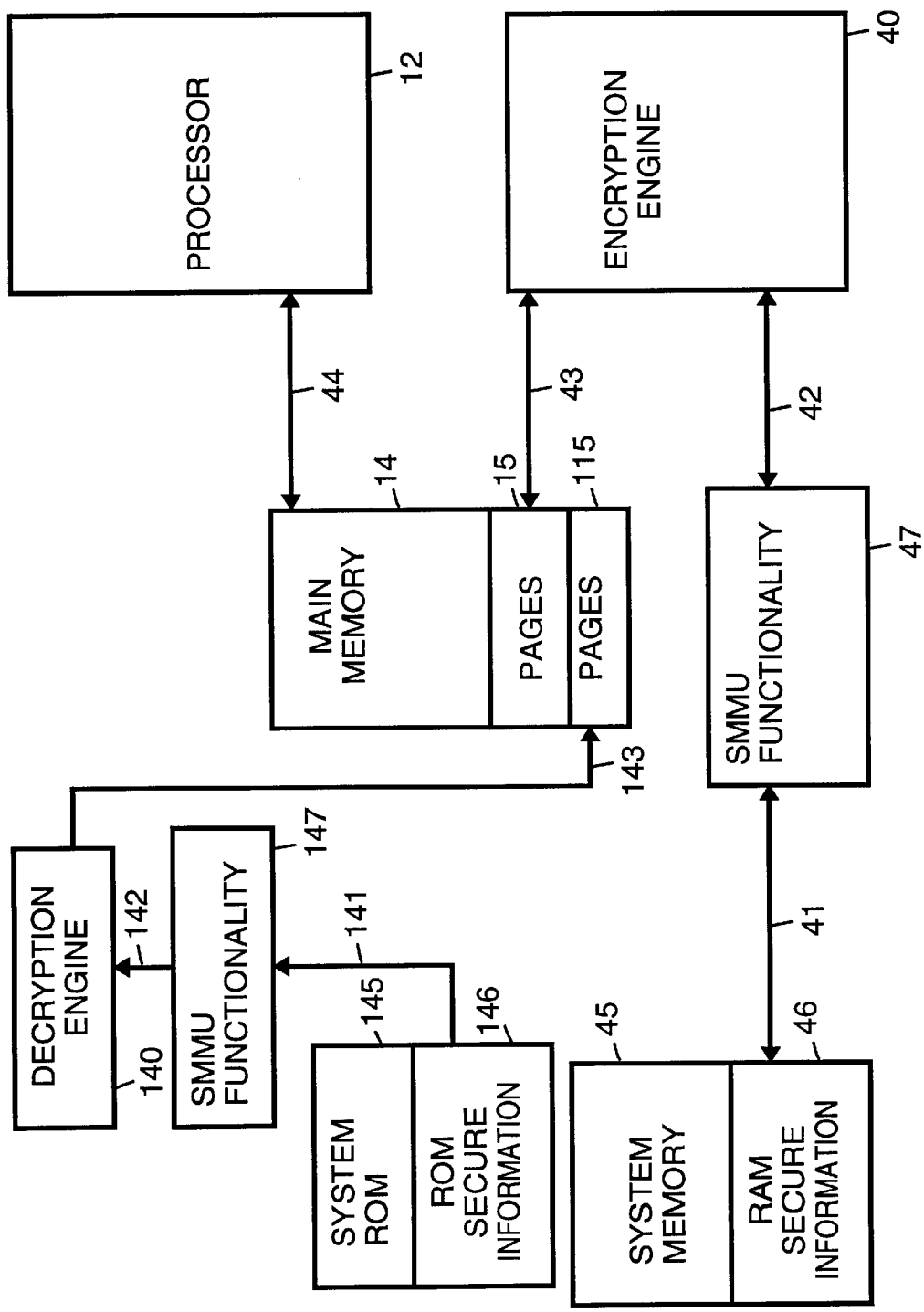
FIG. 4 is a simplified block diagram which shows data flow of secure information from an external system memory into cache memory within the integrated circuit shown in FIG. 2 in accordance with the preferred embodiment of the present invention.

FIG. 4 is a simplified block diagram which shows data flow of secure information from external system memory 45 into a data cache memory (pages 15 of main memory 14) for system processor 12 and shows data flow of secure information from external ROM 46 into an instruction cache memory (pages 115 of main memory 14) for system processor 12. A page of information from secure information 46 of external system memory 45 is received by an SMMU function 47 of the integrated circuit. For example, the page of information contains secure data to be used by system processor 12. As discussed above, SMMU function 47 is implemented by soft SMMU hardware 13 and SMMU processes running on system processor 12.

SMMU function 47 uses encryption engine 40 (or algorithms run by system processor 12) to decrypt the page of secure information, and places the decrypted information within pages 15 of main memory 14. Processor 12 can then access the decrypted information.

A page of information from secure information 146 of external ROM 145 is received by an SMMU function 147 of the integrated circuit. For example, the page of information contains secure instructions to be executed by system processor 12. SMMU function 147 is implemented by soft SMMU hardware 13 and SMMU processes running on system processor 12.

SMMU function 147 uses encryption engine 140 (or algorithms run by system processor 12) to decrypt the page of secure information, and places the decrypted information within pages 115 of main memory 14. Processor 12 can then access the decrypted information.

Figure 5:
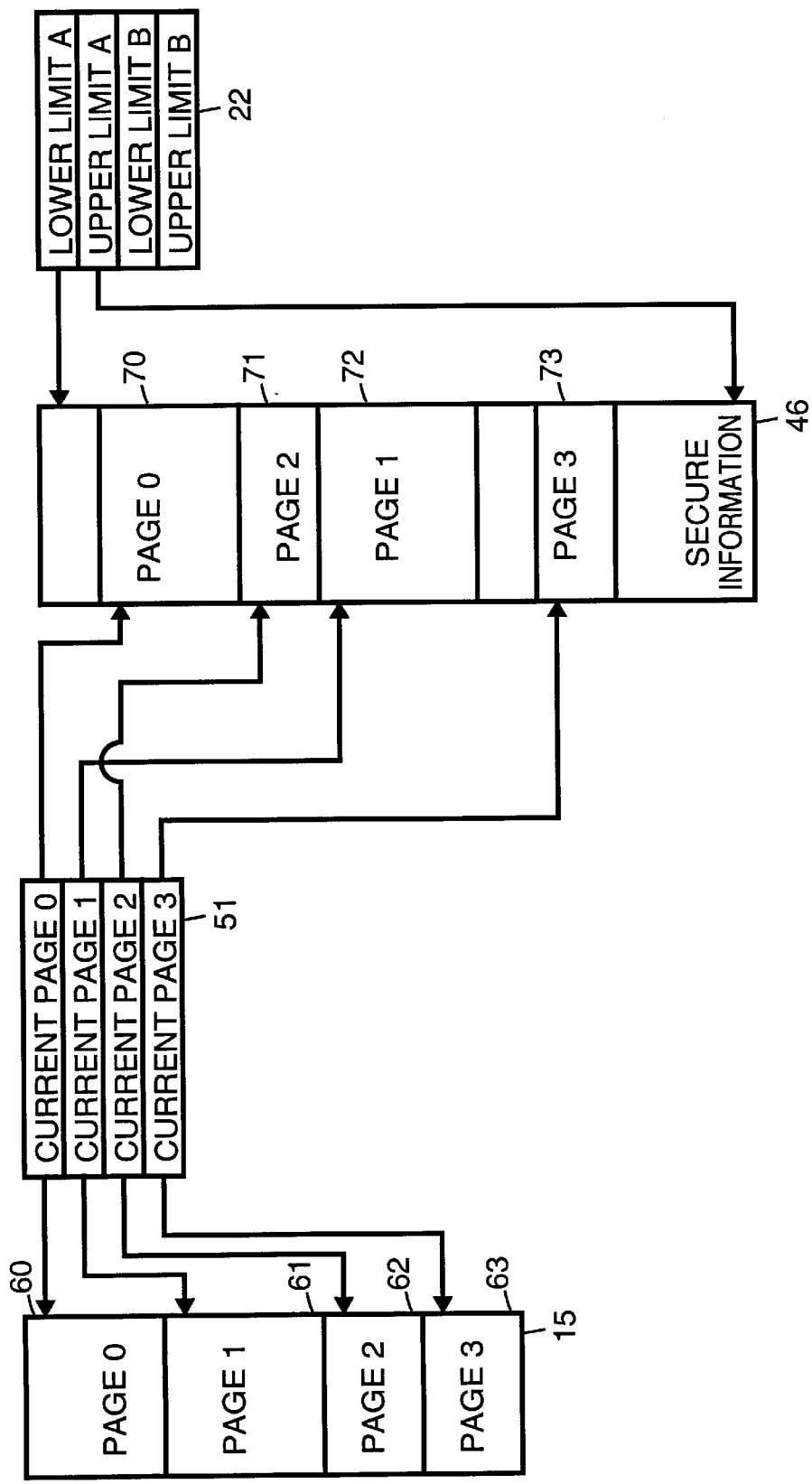
FIG. 5 illustrates usage of registers within the secure memory management unit shown in FIG. 3 in accordance with the preferred embodiment of the present invention.

FIG. 5 shows usage of registers within soft SMMU 13 for data from external system memory 45. Limit registers 22 store page limits for secure information within secure information 46 of external system memory 45 system. For example, limit registers 22 include a register which contains a lower limit to a section A and an upper limit to section A of secure information 46, as shown in FIG. 5. Limits for additional segments also may be stored in limit registers 22, as illustrated by the register which contains a lower limit to a section B and the register which contains an upper limit to section B.

Current page information registers 51 identify addresses of pages currently in pages 15 of main memory 14. These pages, as needed, are moved back and forth from secure information 46 of external system memory 45 system, as described above. Use of current page information registers 51 is described more fully above in the discussion of registers 24, 26 and 28 shown in FIG. 3.

Figure 6:
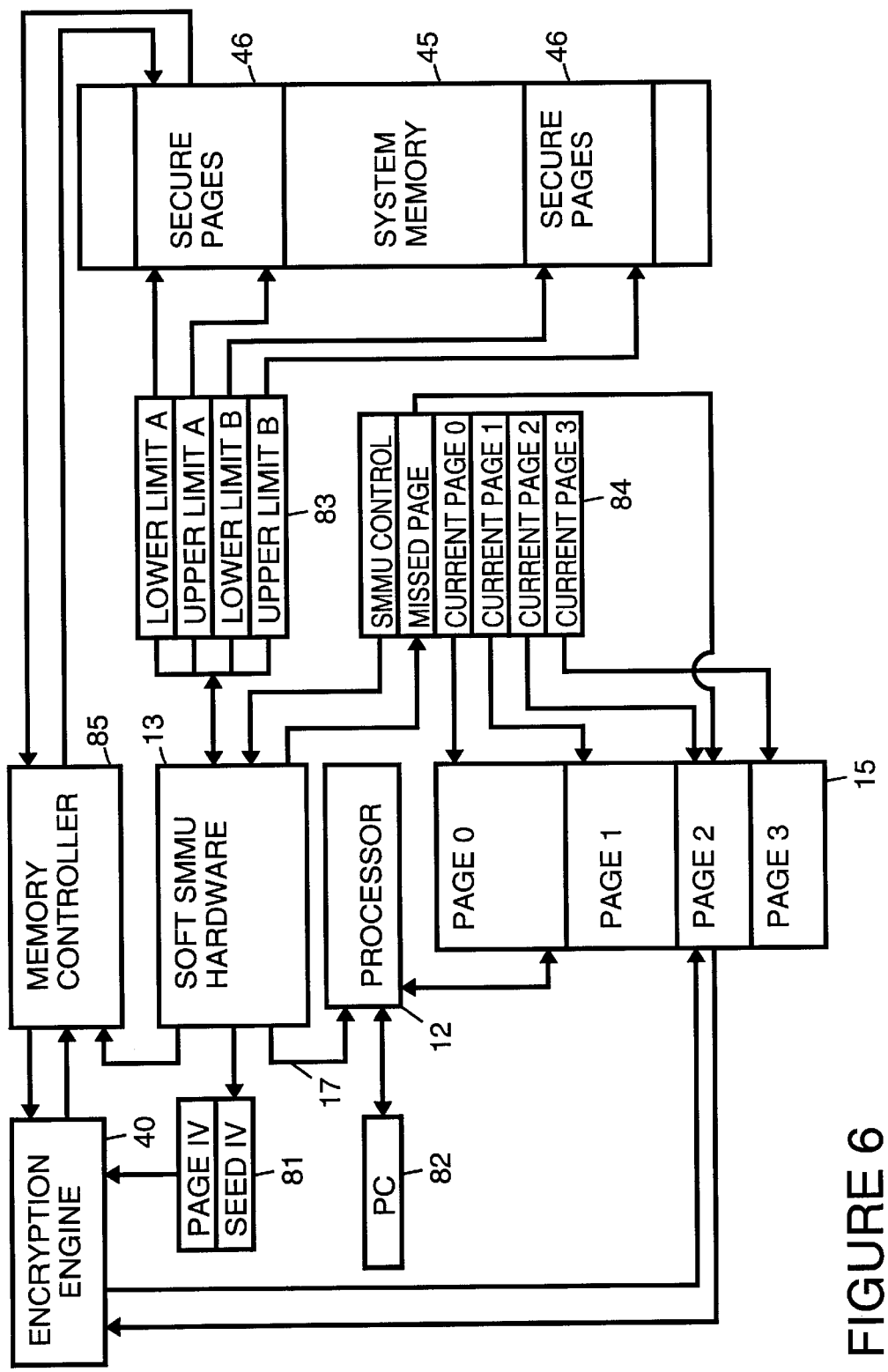
FIG. 6 is a simplified block diagram which illustrates data flow for a data miss within the integrated circuit shown in FIG. 2 in accordance with the preferred embodiment of the present invention.

FIG. 6 illustrates what happens when a page miss occurs for pages 15. A page miss is initiated when a program counter 82 for system processor 12 encounters an address which is not currently in main memory (SRAM) 14. Soft SMMU hardware 13 detects this as described above. Upon detection, soft SMMU 13 signals processor 12 on abort line 17. The SMMU process then takes control. If the requested address is within either the A or B limits (as set out in limit registers 22), the SMMU process claims the address and begins the process of fetching the page. Otherwise, the SMMU process will not claim the address and instead will allow a memory controller 85 to fetch the data.

Once the SMMU process claims the address (that is soft SMMU 13 has asserted the abort signal on abort line 17) a series of events occur as described above. The SMMU process writes a page back from pages 15, if necessary, and determines which of pages 15 to replace and computes the Page IV in registers 81. Page IV and seed 14 are specific to DES encryption. Page IV is used in coordination with seed IV to create a unique startup value for each 64 word block. The method for determining the page to swap is as follows:

Next Page=(Last hit Page+1)mod 4

Last hit page is the page which was most recently hit. Hence the algorithm is cyclic in that it simply picks the next page in sequence.

The external page from secure pages 46 in external system memory 45 is loaded into the input registers of encryption engine 40 and decryption begins. The output registers of encryption engine 40 are then moved into the appropriate page within pages 15 of main memory 14. The SMMU process will also update the missed page register which indicates which page was most recently swapped. Once the page has been loaded into pages 15, the SMMU process re-enables normal processing of processor 12.

A write back of data from pages 15 occurs if two conditions are met: the external memory limit range is write back enabled and the page being swapped out has changed. Only external system memory 45 is write back enabled, not pages 15 of main memory 14.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method by which an integrated circuit accesses first encrypted data stored in a first external memory and accesses second encrypted data stored in a second external memory, the first external memory and the second external memory being external to the integrated circuit, the method comprising the following steps:
   (a) when accessing a first portion of the first encrypted data stored in the first external memory, performing the following substep:
      (a.1) using a first algorithm to decrypt the first portion of the first encrypted data, decryption using the first algorithm being performed within the integrated circuit; and,
   (b) when accessing a first portion of the second encrypted data stored in the second external memory, performing the following substep:
      (b.1) using a second algorithm to decrypt the first portion of the second encrypted data, decryption using the second algorithm being performed within the integrated circuit, wherein the second algorithm is different than the first algorithm.

2. A method as in claim 1 wherein:
   in step (b) the first portion of the second encrypted data includes instructions for execution by a processor; and,
   in step (a) the first portion of the first encrypted data includes data used during execution by the processor.

3. A method as in claim 1 additionally comprising the following step:
   (c) when returning the first portion of the first encrypted data to the first external memory, performing the following substep:
      (c.1) using the first algorithm to encrypt the first portion of the first encrypted data.

4. A method as in claim 1 additionally comprising the following step:
   (c) upon reset of the integrated circuit, performing the following substep:
      (c.1) generating a new decryption key for the first algorithm.

5. A method as in claim 1 additionally comprising the following step:
   (c) upon start-up of the integrated circuit, performing the following substep:
      (c.1) generating a new decryption key for the first algorithm.

6. A method as in claim 1 wherein the first external memory is a random access memory and the second external memory is a read-only memory.

7. An integrated circuit which accesses first encrypted data stored in a first external memory and accesses second encrypted data stored in a second external memory, the first external memory and the second external memory being external to the integrated circuit, the integrated circuit comprising:
   a first algorithm implementation means for, when accessing a first portion of the first encrypted data stored in the first external memory, using a first algorithm to decrypt the first portion of the first encrypted data; and,
   a second algorithm implementation means for, when accessing a first portion of the second encrypted data stored in the second external memory, using a second algorithm to decrypt the first portion of the second encrypted data, wherein the second algorithm is different than the first algorithm.

8. An integrated circuit as in claim 7 additionally comprising:
   a processor, wherein the first portion of the second encrypted data includes instructions for execution by the processor, and the first portion of the first encrypted data includes data used during execution by the processor.

9. An integrated circuit as in claim 7 wherein the first algorithm implementation means is additionally for, when returning the first portion of the first encrypted data to the first external memory, using the first algorithm to encrypt the first portion of the first encrypted data.

10. An integrated circuit as in claim 7 additionally comprising:
    generation means for generating a new decryption key for the first algorithm upon reset of the integrated circuit.

11. An integrated circuit as in claim 7 additionally comprising:
    generation means for generating a new decryption key for the first algorithm upon start-up of the integrated circuit.

12. An integrated circuit as in claim 7 wherein the first external memory is a random access memory and the second external memory is a read-only memory.

* * * * *